June 3, 1924.

A. LANZETTA

CLUTCH

Filed Aug. 25, 1919

1,496,059

INVENTOR
ANTHONY LANZETTA
BY Richard Geier
ATTORNEYS

Patented June 3, 1924.

1,496,059

UNITED STATES PATENT OFFICE.

ANTHONY LANZETTA, OF NEW YORK, N. Y.

CLUTCH.

Application filed August 25, 1919. Serial No. 319,558.

*To all whom it may concern:*

Be it known that I, ANTHONY LANZETTA, a citizen of the United States, residing at New York city, Bronx County, New York, have invented certain new and useful Improvements in Clutches, of which the following is a specification.

This invention relates to clutches and has for its principal object to provide a new and improved construction of a clutch provided with a spring to normally hold the cooperating clutch members in driving relationship and to so construct the clutch members that slipping thereof will be permitted when the driving torque exceeds a predetermined amount, and also so that the movement of the clutch members into driving engagement will produce gradual taking up or transmission of the torque during the initial stages of such movement.

A further object is to provide a pair of cooperating clutch members, one having a plurality of recesses and the other a plurality of projections adapted to engage said recesses and to make each of said projections separately adjustable relatively to the clutch members.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification:

Figure 1:
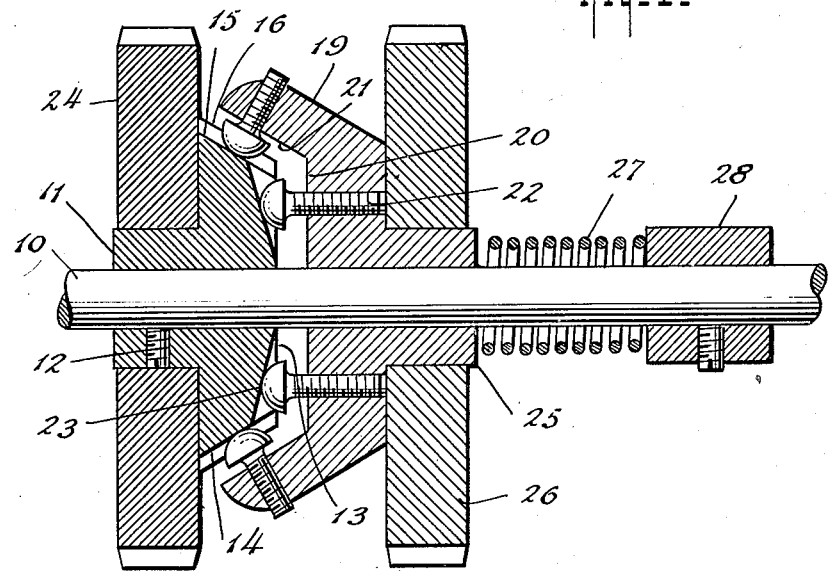
Fig. 1 is a central longitudinal section through a clutch embodying my invention.
Figure 2:
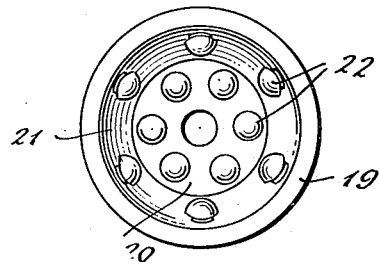
Fig. 2 is an elevation of the engaging face of the female clutch member.

As shown in the drawings, the numeral 10 indicates a driving shaft of any suitable dimensions to which one of the clutch members preferably the male member 11 is suitably secured as by means of the set screw 12. The member 11 is shaped to resemble a bevel gear and is provided with a plane surface 13 and an inclined surface 14, forming a truncated cone shaped surface.

Figure 3:
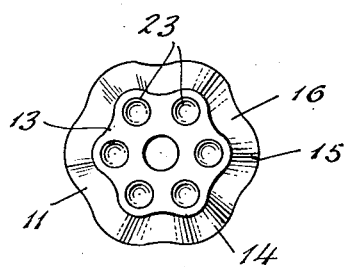
Fig. 3 is a similar view of the male clutch member.

The surface 14 is of irregular or wave-like contour as shown in Fig. 3 having the raised portions 15 and corresponding depressions 16.

The female clutch member 19 is of a cup shaped configuration to engage over the member 11 and is provided with the plane surface 20 and the inclined surface 21, which plane and inclined surfaces, are substantially parallel with the plane and inclined surfaces respectively of the male member. A plurality of projections 22 which as shown are preferably in the form of round headed screws are mounted in the female clutch member 19 and are separately adjustable to and from the faces of said member, the projections on the inclined surface being adapted to engage within the depressions 16 of the male member, and the projections on the plane surface being adapted to engage within the recesses 23 provided in the plane surface 13 of the male member.

As shown in the drawings, the male clutch member which is secured to the shaft 10, has a gear 24 secured thereto, while the female member 19 is slidably mounted upon the shaft 10 and is provided with a hub 25 upon which the gear 26 is mounted to transmit the power by any suitable gear train connected to the mechanism to be driven. It will be understood that any of the usual expedients such as a pair of separate aligned driving and driven shafts could be employed instead of the separate gears 24 and 26. A spring 27 coiled about the shaft 10 has one end thereof abutting against the face of the hub 25 and the other end thereof abutting against a collar 28 secured to the shaft 10, to normally hold female clutch member in engagement with male member.

Figure 4:
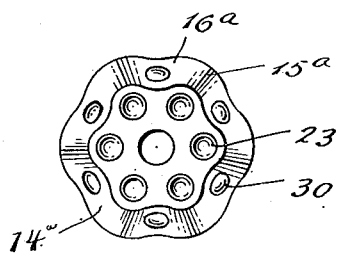
Fig. 4 is a similar view of a modified form of the male clutch member.

In the form of clutch member shown in Fig. 4, in addition to the projections 15$^a$ and depressions 16$^a$, the inclined surface 14$^a$ is provided with a plurality of recesses 30 similar to the recesses 23 in the plane face thereof.

The operation of the device is as follows, assuming that the male clutch member 11 is being rotated by the gear 24, it will be seen that the pressure of the spring 27 will hold the female clutch member 19 with its projections 22 in engagement with the cooperating recesses of the male clutch member. If the resistance offered by the mechanism driven by the gear 26 exceeds a predetermined amount regulated by the pressure of the spring 27, the female clutch member will be moved to the right an amount sufficient to disengage the clutch members. As the torque decreases the spring 27 will again move the clutch members into driving relationship, the projections 22 upon the inclined surface thereof engaging gradually before the projections upon the plane surface. It will thus be seen that after the clutch has slipped it will take up again gradually without sudden jerks.

What I claim as new is:

1. In a clutch, the combination of a pair of cooperating driving and driven members having opposed substantially plane surfaces, one of said members having an annular flange to provide an inclined surface extending at an angle from the periphery of its plane surface to form a cup shaped member, and the other of said members having an inclined surface parallel to and adapted to be substantially enclosed by said annular flange, one of said members being provided with a plurality of projections extending outwardly from its plane and inclined surfaces and the other of said members being provided with a plurality of cooperating recesses in which said projections are adapted to be received, the projections and recesses of said inclined surfaces being constructed and arranged to be engaged in driving relationship prior to the engagement of the projections and recesses of the plane surfaces whereby a gradual take up of the clutch is produced.

2. In a clutch, the combination of a pair of cooperating driving and driven members having opposed substantially plane surfaces, one of said members having an annular flange to provide an inclined surface extending at an angle from the periphery of its plane surface to form a cup shaped member, and the other of said members having an inclined surface parallel to and adapted to be substantially enclosed by said annular flange, one of said members being provided with a plurality of projections extending outwardly from and adjustable to and from its inclined surface and the other of said members being provided on its inclined surface with a plurality of depressions in which said projections are adapted to be received.

3. In a clutch, the combination of a pair of cooperating driving and driven members having opposed substantially plane surfaces, one of said members having an annular flange to provide an inclined surface extending at an angle from the periphery of its plane surface to form a cup shaped member, and the other of said members having an inclined surface parallel to and adapted to be substantially enclosed by said annular flange, one of said members being provided with a plurality of projections extending outwardly from and adjustable to and from its plane and inclined surfaces and the other of said members being provided with a plurality of cooperating recesses in which said projections are adapted to be received, the projections and recesses of said inclined surfaces being constructed and arranged to be engaged in driving relationship prior to the engagement of the projections and recesses of the plane surfaces whereby a gradual take up of the clutch is produced.

In testimony whereof, I have signed my name to this specification in the presence of two subscribing witnesses, this 23d day of August, 1919.

ANTHONY LANZETTA.

Witnesses:
JAMES F. DUHAMEL,
C. C. BRUCKNER.